(12) United States Patent
Chen (10) Patent No.: US 10,218,195 B2
(45) Date of Patent: Feb. 26, 2019

(54) SWITCHING-TYPE CHARGING CIRCUIT CAPABLE OF QUICKLY DROPPING THE VOLTAGE AT THE INPUT END TO ZERO

(71) Applicant: ANPEC ELECTRONICS CORPORATION, Hsinchu (TW)

(72) Inventor: Chih-Ning Chen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 203 days.

(21) Appl. No.: 15/455,220

(22) Filed: Mar. 10, 2017

(65) Prior Publication Data

US 2018/0183253 A1 Jun. 28, 2018

(30) Foreign Application Priority Data

Dec. 23, 2016 (TW) .............................. 105142997 A (51) Int. Cl.
*H02J 7/00* (2006.01)
(52) U.S. Cl.
CPC .......... *H02J 7/0052* (2013.01); *H02J 7/0072* (2013.01); *H02J 2007/0059* (2013.01)
(58) Field of Classification Search
CPC ................. H02J 7/0052; H02J 7/0072; H02J 2007/0059; H02J 7/0042; H02J 7/0045; H02J 7/0093; H02J 7/045; H02J 7/022; Y02E 60/12; H01M 10/44; H01M 10/46
USPC ................................................ 320/107, 128
See application file for complete search history.

(56) References Cited

U.S. PATENT DOCUMENTS

| 2014/0152239 A1* | 6/2014 | Yao ........................ H02J 7/0081 320/107 |
| 2015/0198637 A1* | 7/2015 | Matsumoto ........... H02J 7/0052 320/114 |
| 2015/0357858 A1* | 12/2015 | Deng .................... H02J 7/0093 320/107 |

FOREIGN PATENT DOCUMENTS

| CN | 103427451 A | 12/2013 |
| CN | 104009529 A | 8/2014 |
| TW | 200740080 A | 10/2007 |
| TW | 201429139 A | 7/2014 |

* cited by examiner

*Primary Examiner* — Richard Isla
*Assistant Examiner* — Mohammed J Sharief
(74) *Attorney, Agent, or Firm* — Li & Cai Intellectual Property (USA) Office (57) ABSTRACT

Disclosed is a switching-type charging circuit including a first switch, a current detection unit, a switching circuit and a control circuit. The current detection unit is connected to the first switch and detects a current flowing through the first switch. The switching circuit is connected to the input end of the switching-type charging circuit through the first switch to receive an input voltage, and correspondingly outputs an output voltage to a battery through an inductor. When the input voltage of the switching-type charging circuit is cut off, an inverse current flowing to the first switch through the switching circuit is generated by the battery, and the control circuit adjusts the working frequency of the switch circuit to make the inverse current lower and become equal to or less than a quiescent current.

10 Claims, 4 Drawing Sheets

SWITCHING-TYPE CHARGING CIRCUIT CAPABLE OF QUICKLY DROPPING THE VOLTAGE AT THE INPUT END TO ZERO

BACKGROUND

1. Technical Field

The present disclosure relates to a switching-type charging circuit; in particular, to a switching-type charging circuit that can quickly drop the voltage at its input end to zero when a supply voltage is cut off.

2. Description of Related Art

Conventionally, a linear charger is used to charge handheld devices, such as a mobile phone. One of the features of the linear charger is that, the input current of the linear charger is always equal to the output current of the linear charger. If the output voltage of a power adaptor is 5V and the voltage of a battery is 3V~4.2V, a power loss may occur when the voltage of the battery decreases to a certain value. Specifically, a supply power from the power adapter is partially consumed by the linear charger. In addition, the power loss would lead to a heating issue in the charging process and cause the charging current hard to be raised.

Because of the above defects, linear chargers have been gradually replaced by switching chargers. During a charging process in which a switching charger is used, when the voltage of the battery decreases, the current provided to the battery is actually larger than the input current of the switching charger. Thus, the power consumed by the charger is less. However, there may be an inverse current generated in the switching charger. The inverse current is generated at the moment when the switching charger is just plugged off from a socket (that is, the input voltage of the switching charger is cut off). When the switching charger is plugged from the socket, the battery generates an inverse current that flows to the input end of the switching charger, so that the voltage at the input end of the charger does not drop to zero immediately.

SUMMARY

The present disclosure provides a switching-type charging circuit. An input voltage is received by an input end of the switching-type charging circuit, and an output voltage is correspondingly provided to a battery from an output end of the switching-type charging circuit. This switching-type charging circuit includes a first switch, a current detection unit, a switching circuit, a control circuit and a discharging unit. The current detection unit is connected to the first switch, and configured to detect a current flowing through the first switch. The switching circuit is connected to the input end of the switching-type charging circuit through the first switch to receive the input voltage. Correspondingly, the switching circuit provides the output voltage to the battery through an inductor. The control circuit is connected between the inductor and the output end of the switching-type charging circuit. The control circuit adjusts a working frequency of the switching circuit according to a first inductive current flowing through the inductor and the output voltage provided from the output end of the switching-type charging circuit. One end of the discharging unit is connected to the input end of the switching-type charging circuit, the first switch and the current detection unit, and the other end of the discharging unit is connected to a grounding end. The battery generates a second inductive current and the second inductive current flows to the first switch through the inductor, when the input voltage of the switching-type charging circuit is cut off. At this time, the current detection unit controls the discharging unit to output a discharging current to the grounding end according to the current flowing through the first switch, such that the voltage at the input end of the switching-type charging circuit drops to zero.

The present disclosure further provides a switching-type charging circuit. An input voltage is received by an input end of the switching-type charging circuit, and an output voltage is correspondingly provided to a battery from an output end of the switching-type charging circuit. This switching-type charging circuit includes a first switch, a current detection unit, a switching circuit, a control circuit and a comparator. The current detection unit is connected to the first switch, and is configured to detect a current flowing through the first switch. The switching circuit is connected to the input end of the switching-type charging circuit through the first switch to receive the input voltage. Correspondingly, the switching circuit provides the output voltage to the battery through an inductor. The control circuit is connected between the inductor and the output end of the switching-type charging circuit. The control circuit adjusts a working frequency of the switching circuit according to a first inductive current flowing through the inductor and the output voltage provided from the output end of the switching-type charging circuit. A non-inverting input end of the comparator is connected to the current detection unit, an inverting input end of the comparator receives a reference current signal, and an output end of the comparator is connected to the control circuit. The battery generates a second inductive current and the second inductive current flows to the first switch through the inductor, when the input voltage received by the input end of the switching-type charging circuit is cut off. At this time, the current detection unit outputs a current signal indicating the current flowing through the first switch. Then, the comparator compares the current signal and the reference current signal and outputs a comparison result to the control circuit. The control circuit decreases the working frequency of the switching circuit if the comparison result indicates that the current signal is larger than or equal to the reference current signal. In this manner, the battery generates the second inductive current less frequently, which makes the current flowing through the first switch decrease to be equal to or less than a preset current.

To sum up, when a supply voltage of the switching-type charging circuit provided by the present disclosure is cut off during the charging process of a battery, the battery generates an inverse current flowing to an input end of the switching-type charging circuit. However, the switching-type charging circuit provided by the present disclosure can decrease this inverse current by decreasing its own working frequency to reduce the inverse current. As a result, the voltage at the input end of the switching-type charging circuit can be dropped to zero by a quiescent current of the switching-type charging circuit. Alternatively, the switching-type charging circuit provided by the present disclosure generates a discharging current to a grounding end to drop the voltage at its input end to zero.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present disclosure. As used herein, the term "and/or," includes any and all combinations of one or more of the associated listed items.

One Embodiment of the Switching-Type Charging Circuit

Figure 1:
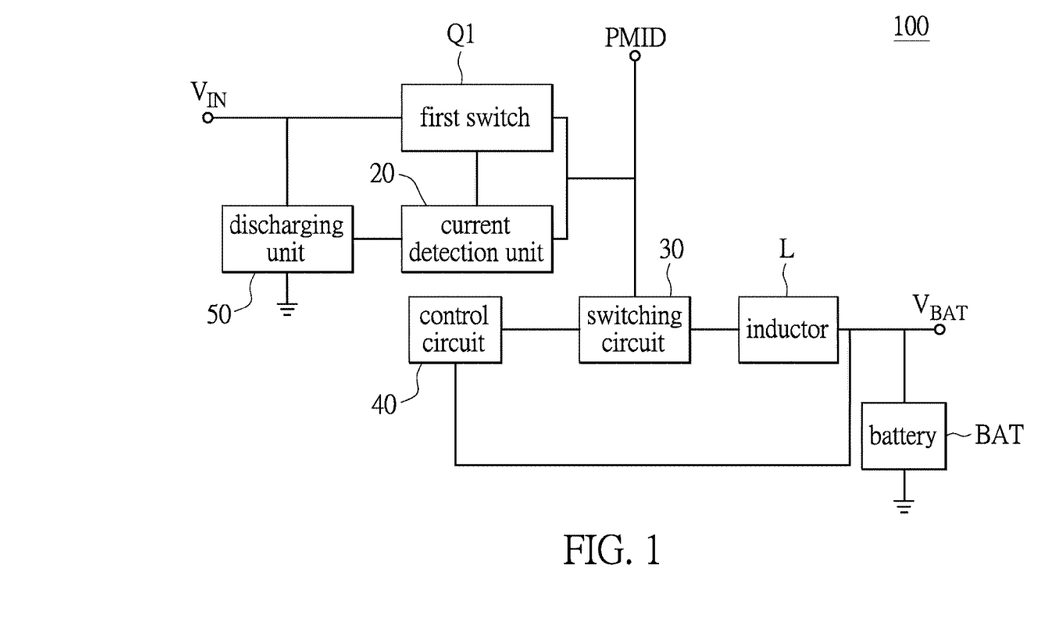
FIG. 1 shows a block diagram of a switching-type charging circuit of one embodiment of the present disclosure.

Referring to FIG. 1, a block diagram of a switching-type charging circuit of one embodiment of the present disclosure is shown. A switching-type charging circuit 100 receives an input voltage $V_{IN}$ via its input end and correspondingly outputs an output voltage $V_{BAT}$ to a battery BAT from its output end.

The switching-type charging circuit 100 includes a first switch Q1, a current detection unit 20, a switching circuit 30, a control circuit 40 and a discharging unit 50. As shown in FIG. 1, the current detection unit 20 is connected to the first switch Q1, the switching circuit 30 is connected to the input end of the switching-type charging circuit 100 through the first switch Q1, and the control circuit 40 is connected between an inductor L and the output end of the switching-type charging circuit 100. During a process in which a battery is charged by the switching-type charging circuit 100, the switching circuit 30 receives an input voltage $V_{IN}$ and correspondingly provides an output voltage $V_{BAT}$ to the battery BAT through the inductor L. In order to provide a proper output voltage $V_{BAT}$ to the battery BAT, the control circuit 40 adjusts a working frequency of the switching circuit 30 according to a first inductive current $I_{L1}$ flowing through the inductor L and the output voltage of the switching-type charging circuit 100.

When the input voltage $V_{IN}$ received by the switching-type charging circuit 100 is cut off (for example, when a charger using the switching-type charging circuit 100 is plugged off from a socket), the voltage at the input end of the switching-type charging circuit 100, ideally, drops to zero. The skill in the art should easily understand that, at the moment when the input voltage $V_{IN}$ of the switching-type charging circuit 100 is cut off, the switching circuit 30 is still working. At the same time, the battery BAT generates an inverse current of which the flowing direction is opposite to the flowing direction of the first inductive current $I_{L1}$. This inverse current (described as a second inductive current $I_{L2}$ hereinafter) flows to the first switch Q1 through the inductor L. Due to the second inductive current $I_{L2}$, the voltage at the input end of the switching-type charging circuit 100 does not drop to zero at the same time when the input voltage $V_{IN}$ of the switching-type charging circuit 100 is cut off. Specifically, the voltage at the input end of the switching-type charging circuit 100 is provided by the inverse current generated by the battery BAT.

To make the voltage at the input end of the switching-type charging circuit 100 drop to zero at the same time when the input voltage $V_{IN}$ of the switching-type charging circuit 100 is cut off, a discharging unit 50 is thus configured in the switching-type charging circuit 100. As shown in FIG. 1, one end of the discharging unit 50 is connected to the first switch Q1, the current detection unit 20 and the input end of the switching-type charging circuit 100, and the other end of the discharging unit 50 is connected to a grounding end. The current detection unit 20 detects the current flowing through the first switch Q1. When the input voltage $V_{IN}$ of the switching-type charging circuit 100 is cut off and the second inductive current $I_{L2}$ is generated and flows to the first switch Q1, the current detection unit 20 controls the discharging unit 50 to output a discharging current $I_{DIS}$ to the grounding end according to the current flowing through the first switch Q1 which is detected by the current detection unit 20. It is worth mentioning that, the discharging current $I_{DIS}$ equals to the current flowing through the first switch Q1. In other words, the discharging unit 50 outputs the discharging current $I_{DIS}$ to exactly discharge the current flowing through the first switch Q1, and thus the voltage at the input end of the switching-type charging circuit 100 is lowered to zero.

Figure 2:
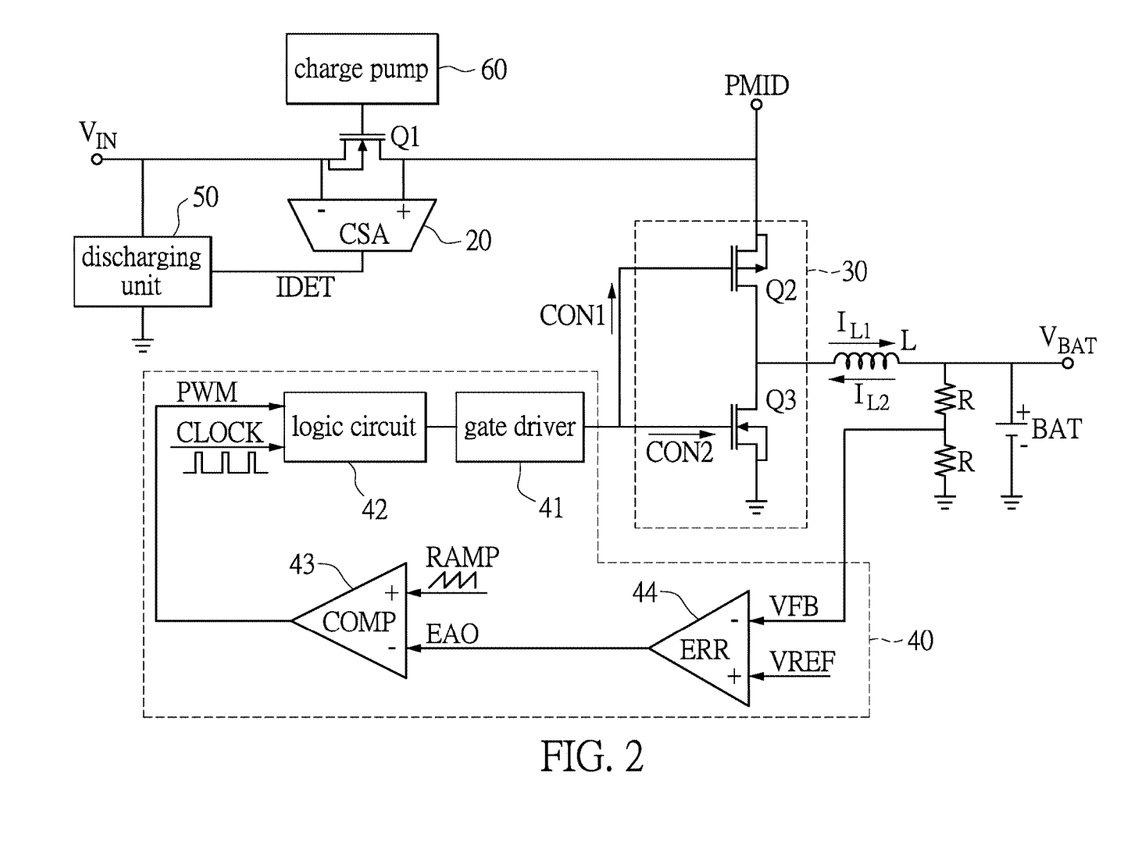
FIG. 2 shows a circuit diagram of the switching-type charging circuit shown in FIG. 1.

In the following description, the circuit configuration and the working principle of the switching-type charging circuit 100 are further illustrated. Referring to FIG. 2, a circuit diagram of the switching-type charging circuit shown in FIG. 1 is shown.

As shown in FIG. 2, in the switching-type charging circuit 100, the first switch Q1 is a NMOS transistor. A source of the NMOS transistor is connected to the input end of the switching-type charging circuit 100, the current detection unit 20 and one end of the discharging unit 50. In addition, a drain of the NMOS transistor is connected to the current detection unit 20 and the switching circuit 30, and a gate of the NMOS transistor is connected to a charge pump 60.

In this embodiment, the current detection unit 20 can be a Current-Sense Amplifier (CSA), but it is not limited thereto. As shown in FIG. 2, an inverting input end of the current detection unit 20 is connected to the source of the NMOS transistor, and a non-inverting input end of the current detection unit 20 is connected to the drain of the NMOS transistor. Continued from the preceding descriptions of FIG. 1, in FIG. 2, the current detection unit 20 outputs a current signal IDET, which indicates the current flowing through the first switch Q1, according to the current detected by the current detection unit 20. According to this current signal IDET, the current detection unit 20 can control the discharging unit 50 to exactly output a discharging current of which the current value is equal to the current value of the current flowing through the first switch Q1 to the grounding end. In this manner, the voltage at the input end of the switching-type charging circuit 100 can be dropped to zero at the same time when the input voltage $V_{IN}$ of the switching-type charging circuit 100 is cut off.

Additionally, the switching circuit 30 includes a second switch Q2 and a third switch Q3. As shown in FIG. 2, a second end of the second switch Q2 receives a supply voltage PMID and is connected to the first switch Q1 and the current detection unit 20. A control end of the second switch Q2 is connected to the control circuit 40. A first end of the third switch Q3 is connected to a first end of the second switch Q2 and the inductor L, a control end of the third switch Q3 is connected to the control circuit 40, and a second end of the third switch Q3 is connected to the grounding end.

In this embodiment, as shown in FIG. 2, the second switch Q2 can be a PMOS transistor and the third switch Q3 can be a NMOS transistor. The first end of the second switch Q2 is the drain of the PMOS transistor, and the second end of the second switch Q2 is the source of the PMOS transistor. The first end of the third switch Q3 is the drain of the NMOS transistor, and the second end of the third switch Q3 is the source of the NMOS transistor. The control end of the second switch Q2 is the gate of the PMOS transistor, and the control end of the third switch Q3 is the gate of the NMOS transistor. However, it is not limited thereto.

In the switching-type charging circuit 100, a charging voltage required by the battery is provided by controlling the duty cycle of the switching circuit 30 (that is, by controlling the ratio of turning on/off of switches in the switching circuit 30). Specifically, the control circuit 40 can obtain information about the output voltage of the switching-type charging circuit 100 through the voltage dividing circuit consisted of resistors R (herein, the voltage information about the output voltage refers to the feedback voltage VFB shown in FIG. 2). After that, the control circuit 40 compares the feedback voltage VFB with a reference voltage VREF to generate a compensated voltage EAO. This compensated voltage EAO is received by a comparator for the pulse width modulation 43. This comparator for the pulse width modulation 43 compares the compensated voltage EAO with a ramp signal RAMP, and accordingly outputs a pulse width modulation signal PWM to a logic circuit 42 in the control circuit 40. Finally, according to this pulse width modulation signal PWM and a clock signal CLOCK, the logic circuit 42 controls a gate driver 41 to output a first duty cycle signal CON1 to the gate of the PMOS transistor that is considered the second switch Q2, and controls the gate driver 41 to output a second duty cycle signal CON2 to gate of the NMOS transistor that is considered the third switch Q3. The first duty cycle signal CON1 and the second duty cycle signal CON2 make the second switch Q2 and the third switch Q3 alternately turn on and turn off. In this manner, the switching-type charging circuit 100 can provide a charging voltage required by the battery BAT.

It should be noted that, how the control circuit 40 works during the process in which the second switch Q2 and the third switch Q3 are alternately turned on and turned off should be easily understood by the skill in the art, and thus the redundant information is not repeated.

Another Embodiment of the Switching-Type Charging Circuit

Figure 3:
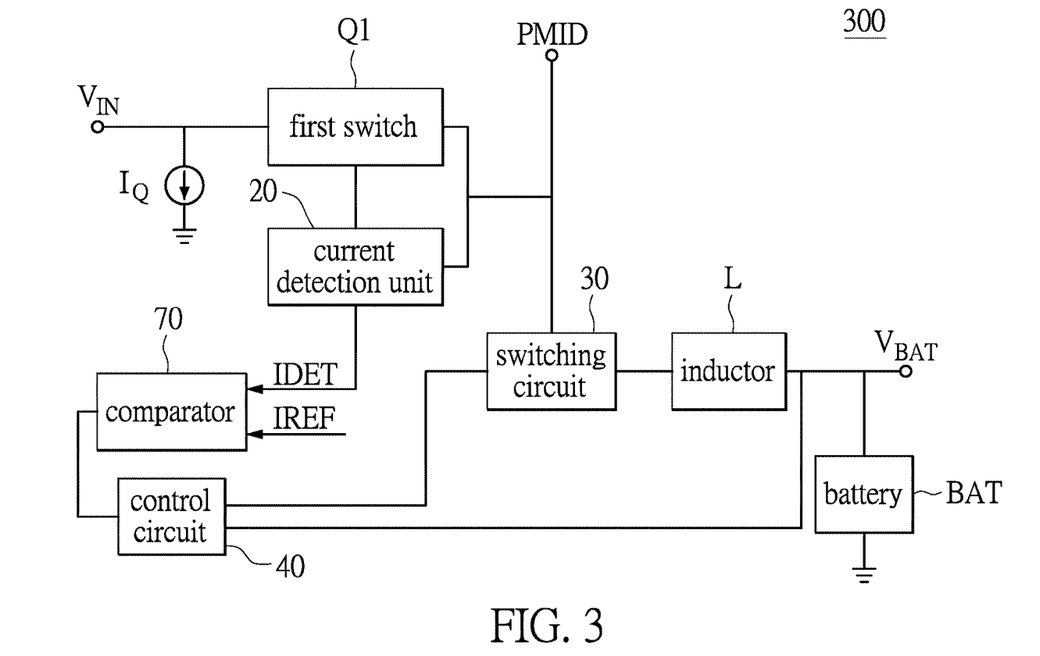
FIG. 3 shows a block diagram of a switching-type charging circuit of another embodiment of the present disclosure.

In the following description, another embodiment is provided to further illustrate the switching-type charging circuit in the present disclosure. Referring to FIG. 3, a block diagram of a switching-type charging circuit of another embodiment of the present disclosure is shown.

A switching-type charging circuit 300 in this embodiment and the switching-type charging circuit 100 shown in FIG. 1 and FIG. 2 have similar circuit configurations. Thus, in FIG. 1, FIG. 2 and FIG. 3, like references indicate similar elements. The difference between the switching-type charging circuit 300 in this embodiment and the switching-type charging circuit 100 shown in FIG. 1 and FIG. 2 is that, there is no discharging unit 50 configured in the switching-type charging circuit 300. Instead, in the switching-type charging circuit 300, there is a comparator 70 configured between the current detection unit 20 and the control circuit 40. The comparator 70 is connected between the current detection unit 20 and the control circuit 40, and receives a reference current signal IREF.

Figure 4:
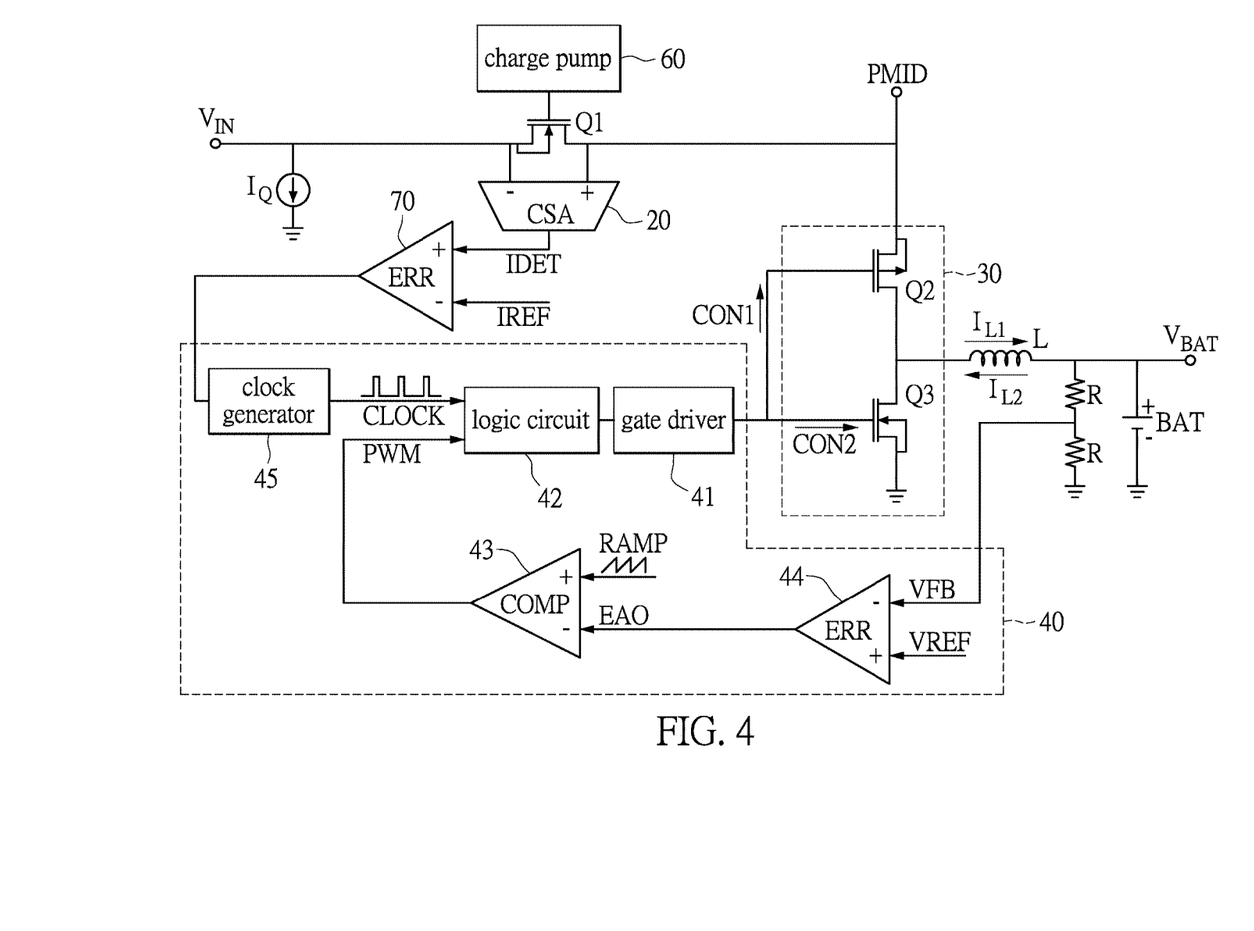
FIG. 4 shows a circuit diagram of the switching-type charging circuit shown in FIG. 3.

Referring to FIG. 4, a circuit diagram of the switching-type charging circuit shown in FIG. 3 is shown.

As shown in FIG. 4, in the switching-type charging circuit 300, the first switch Q1 can be a NMOS transistor. The source of the NMOS transistor is connected to the input end of the switching-type charging circuit 300, the drain of the NMOS transistor is connected to the current detection unit 20 and the switching circuit 30, and the gate of the NMOS transistor is connected to a charge pump 60.

In this embodiment, the current detection unit 20 can be a Current-Sense Amplifier (CSA), but it is not limited thereto. As shown in FIG. 4, the inverting input end of the current detection unit 20 is connected to the source of the NMOS transistor. When the input voltage $V_{IN}$ of the switching-type charging circuit 300 is cut off, the battery BAT generates a second inductive current $I_{L2}$, and this second inductive current $I_{L2}$ flows to the first switch Q1 through the inductor L. The non-inverting input end of the current detection unit 20 is connected to the drain of the NMOS transistor. According to the detected current that flows through the first switch Q1, the current detection unit 20 outputs a current signal IDET indicating the current value of the current flowing through the first switch Q1.

Moreover, similar to the switching-type charging circuit 100, the switching circuit 30 in the switching-type charging circuit 300 includes a second switch Q2 and a third switch Q3. As shown in FIG. 4, the second end of the second switch Q2 receives a supply voltage PMID and is connected to the first switch Q1 and the current detection unit 20. The control end of the second switch Q2 is connected to the control circuit 40. The first end of the third switch Q3 is connected to the first end of the second switch Q2 and the inductor L, the control end of the third switch Q3 is connected to the control circuit 40, and the second end of the third switch Q3 is connected to the grounding end.

In this embodiment, as shown in FIG. 4, the second switch Q2 can be a PMOS transistor and the third switch Q3 can be a NMOS transistor. The first end of the second switch Q2 is the drain of the PMOS transistor, and the second end of the second switch Q2 is the source of the PMOS transistor. The first end of the third switch Q3 is the drain of the NMOS transistor, and the second end of the third switch Q3 is the source of the NMOS transistor. The control end of the second switch Q2 is the gate of the PMOS transistor, and the control end of the third switch Q3 are the gate of the NMOS transistor. However, it is not limited thereto.

Likewise, in the switching-type charging circuit 300, the control circuit 40 can obtain information about the output voltage of the switching-type charging circuit 300 through a voltage dividing circuit consisted of resistors R. Specifically, the control circuit 40 can obtain information about the output voltage of the switching-type charging circuit 300 through the voltage dividing circuit consisted of resistors R (herein, the voltage information about the output voltage of the switching-type charging circuit 300 refers to the feedback voltage VFB shown in FIG. 4). After that, the control circuit 40 compares the feedback voltage VFB with a reference voltage VREF to generate a compensated voltage EAO. This compensated voltage EAO is received by a comparator for the pulse width modulation 43. This comparator for the pulse width modulation 43 compares the compensated voltage EAO with a ramp signal RAMP, and accordingly outputs a pulse width modulation signal PWM to a logic circuit 42 in the control circuit 40. Finally, according to this pulse width modulation signal PWM and a clock signal CLOCK, the logic circuit 42 controls a gate driver 41 to output a first duty cycle signal CON1 to the gate of the PMOS transistor that is considered the second switch Q2, and controls the gate driver 41 to output a second duty cycle signal CON2 to the gate of the NMOS transistor that is considered the third switch Q3. The first duty cycle signal CON1 and the second duty cycle signal CON2 make the second switch Q2 and the third switch Q3 alternately turn on and turn off. In this manner, the switching-type charging circuit 300 can provide a charging voltage required by the battery BAT.

It should be noted that, in the switching-type charging circuit 300, how the control circuit 40 works during the process in which the second switch Q2 and the third switch Q3 are alternately turned on and turned off should be easily understood by the skill in the art, and thus the redundant information is not repeated.

As mentioned above, the difference between the switching-type charging circuit 300 in this embodiment and the switching-type charging circuit 100 shown in FIG. 1 and FIG. 2 is that, there is no discharging unit 50 configured in the switching-type charging circuit 300, and instead, there is a comparator 70 configured between the current detection unit 20 and the control circuit 40. The non-inverting input end of the comparator 70 is connected to an output end of the current detection amplifier 20 to receive the current signal IDET indicating the current value of the current flowing through the first switch Q1. The comparator 70 compares the current signal IDET and a reference current signal IREF, and generates and outputs a comparison result to the control circuit 40. The control circuit 40 decreases the working frequency of the switching circuit 30 if the comparison result indicates that the current signal IDET is larger than or equal to the reference current signal IREF. As a result, the battery BAT generates the second inductive current $I_{L2}$ less frequently and the current flowing through the first switch Q1 decreases to be equal to or less than a quiescent current $I_Q$. It should be noted that, the quiescent current IQ of the switching-type charging circuit 300 is the internal operating current of the switching-type charging circuit 300. For example, the quiescent current IQ can be about 2 mA.

In details, after the comparator 70 compares the current signal IDET and a reference current signal IREF, the comparator 70 generates and outputs a comparison result to a clock generator 45 in the control circuit 40 to adjust a clock signal CLOCK provided by the clock generator 45 to a logic circuit 42. If this comparison result indicates that the current signal IDET is larger than or equal to the reference current signal IREF, the clock generator 45 adjusts the clock signal CLOCK. According to this adjusted clock signal CLOCK, the logic circuit 42 controls the gate driver 41 to output a lower frequency of the first duty cycle signal CON 1 and the second duty cycle signal CON2. As a result, the frequency at which the second switch Q2 and the third switch Q3 are alternately turned on/off is lowered such that the battery BAT generates the second inductive current IL2 less frequently, and finally the current flowing through the first switch Q1 decreases to be equal to or less than the quiescent current IQ of the switching-type charging circuit 300. In this manner, despite of the fact that the second inductive current IL2 is generated by the battery BAT and flows towards the input end of the switching-type charging circuit 300 when the input voltage $V_{IN}$ of the switching-type charging circuit 300 is cut off, the quiescent current IQ of the switching-type charging circuit 300 is always larger than or equal to the current flowing through the first switch Q1. Therefore, the quiescent current IQ is always large enough to drop the voltage at the input end of the switching-type charging circuit 300 to zero.

It should be noted that, in the working mechanism of the control circuit 40, the pulse width modulation signal PWM is for adjusting the first duty cycle signal CON1 and the second duty cycle signal CON2 according to the information about the output voltage of the switching-type charging circuit 300, which is the feedback voltage VFB. The adjusted first duty cycle signal CON1 and the second duty cycle signal CON2 make the second switch Q2 and the third switch Q3 alternately turn on/off to provide a charging voltage required by the battery BAT. In addition, the clock signal CLOCK is for lowering the frequency at which the second switch Q2 and the third switch Q3 are alternately turned on/off, to make the second inductive current $I_{L2}$ generated less frequently by the battery BAT, until the current flowing through the first switch is lowered to be equal to or smaller than the quiescent current IQ of the switching-type charging circuit 300.

Therefore, the difference between the switching-type charging circuit 100 and the switching-type charging circuit 300 can be concluded as follows. When the input voltage of the switching-type charging circuit 100 is cut off, the current flowing through the first switch Q1 is detected and the discharging unit 50 is controlled to output a discharging current $I_{DIS}$ to the grounding end. The current value of the discharging current $I_{DIS}$ is exactly equal to the current value of the current flowing through the first switch Q1, and thus the voltage at the input end of the switching-type charging circuit 100 can be dropped to zero. On the other hand, when the input voltage of the switching-type charging circuit 300 is cut off, the current flowing through the first switch Q1 is detected. After that, the frequency at which the second switch Q2 and the third switch Q3 are alternately turned on/off is lowered according to the current value of the current flowing through the first switch Q1, to make the second inductive current $I_{L2}$ less frequently generated by the battery BAT, until the current flowing through the first switch decreases to be equal to or less than the quiescent current IQ of the switching-type charging circuit 300. Then, the quiescent current IQ is always large enough to drop the voltage at the input end of the switching-type charging circuit 300 to zero.

To sum up, when a supply voltage of the switching-type charging circuit provided by the present disclosure is cut off during the charging process of a battery, the battery generates an inverse current flowing to an input end of the switching-type charging circuit. However, the switching-type charging circuit provided by the present disclosure can decrease this inverse current by decreasing its own working frequency to decrease the inverse current. As a result, the voltage at the input end of the switching-type charging circuit can be dropped to zero by a quiescent current of the switching-type charging circuit. Alternatively, the switching-type charging circuit provided by the present disclosure generates a discharging current to a grounding end to drop the voltage at its input end to zero.

For a charger in which the switching-type charging circuit provided by the present disclosure is configured, at the moment when the charger is plugged off from a socket or a supply of the socket is cut off, although an inverse current is generated by the battery, the voltage at the input end of the switching-type charging circuit in this charger can still be dropped to zero. Thus, a power loss of the battery caused by the inverse current can be effectively avoided.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A switching-type charging circuit, having an input end and an output end, wherein an input voltage is received by the input end of the switching-type charging circuit and an output voltage is correspondingly provided to a battery from the output end of the switching-type charging circuit, comprising:
    a first switch;
    a current detection unit, connected to the first switch, detecting a current flowing through the first switch;
    a switching circuit, connected to the input end of the switching-type charging circuit through the first switch, receiving the input voltage and providing the output voltage to the battery through an inductor;
    a control circuit, connected between the inductor and the output end of the switching-type charging circuit, adjusting a duty cycle of the switching circuit according to the output voltage of the switching-type charging circuit; and
    a discharging unit, having one end connected to the input end of the switching-type charging circuit, the first switch and the current detection unit, and having the other end connected to a grounding end;
    wherein the battery generates a second inductive current and the second inductive current flows to the first switch through the inductor when the input voltage of the switching-type charging circuit is cut off, and the current detection unit controls the discharging unit to output a discharging current to the grounding end according to the current flowing through the first switch, such that the voltage at the input end of the switching-type charging circuit drops to zero.

2. The switching-type charging circuit according to claim 1, wherein the second inductive current is proportional to the discharging current.

3. The switching-type charging circuit according to claim 1, wherein the first switch is a NMOS transistor, a source of the NMOS transistor is connected to the input end of the switching-type charging circuit, the current detection unit and one end of the discharging unit, a drain of the NMOS transistor is connected to the current detection unit and the switching circuit, and a gate of the NMOS transistor is connected to a charge pump.

4. The switching-type charging circuit according to claim 3, wherein the current detection unit is a current detection amplifier, an inverting input end of the current detection amplifier is connected to the source of the NMOS transistor, a non-inverting input end of the current detection amplifier is connected to the drain of the NMOS transistor, a current signal indicating the current flowing through the first switch is outputted from an output end of the current detection amplifier to control the discharging unit to output the discharging current to the grounding end, such that the voltage at the input end of the switching-type charging circuit drops to zero.

5. The switching-type charging circuit according to claim 1, wherein the switching circuit includes:
    a second switch, wherein a second end of the second switch is connected to a supply voltage, the first switch and the current detection unit, and a control end of the second switch is connected to the control circuit; and
    a third switch, wherein a first end of the third switch is connected to the inductor and a first end of the second switch, and a second end of the third switch is connected to the grounding end;
    wherein the control circuit outputs a first duty cycle signal to the control end of the second switch and outputs a second duty cycle signal to a control end of the third switch according to the output voltage of the switching-type charging circuit, to adjust duty cycles of the second switch and the third switch.

6. A switching-type charging circuit, having an input end and an output end, wherein an input voltage is received by the input end of the switching-type charging circuit and an output voltage is correspondingly provided to a battery from the output end of the switching-type charging circuit, comprising:
    a first switch;
    a current detection unit, connected to the first switch, detecting a current flowing through the first switch;
    a switching circuit, connected to the input end of the switching-type charging circuit through the first switch, receiving the input voltage and providing the output voltage to the battery through an inductor;
    a control circuit, connected between the inductor and the output end of the switching-type charging circuit, adjusting a duty cycle of the switching circuit according to the output voltage of the switching-type charging circuit; and
    a comparator, wherein a non-inverting input end of the comparator is connected to the current detection unit, an inverting input end of the comparator receives a reference current signal, and an output end of the comparator is connected to the control circuit;
    wherein the battery generates a second inductive current and the second inductive current flows to the first switch through the inductor when the input voltage of the switching-type charging circuit is cut off, the current detection unit outputs a current signal indicating the current flowing through the first switch, the comparator compares the current signal and the reference current signal and outputs a comparison result to the control circuit, and the control circuit decreases a working frequency of the switching circuit when the comparison result indicates that the current signal is larger than or equal to the reference current signal, such that the second inductive current of the battery decreases and the current flowing through the first switch decreases to be equal to or less than a preset current.

7. The switching-type charging circuit according to claim 6, wherein the preset current is a quiescent current of the switching-type charging circuit.

8. The switching-type charging circuit according to claim 6, wherein the first switch is a NMOS transistor, a source of the NMOS transistor is connected to the input end of the switching-type charging circuit, one end of the discharging unit and the current detection unit, a drain of the NMOS transistor is connected to the current detection unit and the switching circuit, and a gate of the NMOS transistor is connected to a charge pump.

9. The switching-type charging circuit according to claim 7, wherein the current detection unit is a current detection amplifier, an inverting input end of the current detection amplifier is connected to the source of the NMOS transistor, a non-inverting input end of the current detection amplifier is connected to the drain of the NMOS transistor, the current signal indicating the current flowing through the first switch is outputted from an output end of the current detection amplifier according to the current flowing through the first switch.

10. The switching-type charging circuit according to claim 9, wherein the switching circuit includes:

a second switch, wherein a second end of the second switch is connected to a supply voltage, the drain of the NMOS transistor and the non-inverting input end of the current detection amplifier, and a control end of the second switch is connected to the control circuit; and a third switch, wherein a first end of the third switch is connected to the inductor and a first end of the second switch, a control end of the third switch is connected to the control circuit, and a second end of the third switch is connected to a grounding end;

wherein the control circuit outputs a first duty cycle signal to the control end of the second switch and outputs a second duty cycle signal to the control end of the third switch when the current signal is larger than or equal to the reference current signal, to adjust the working frequency of the second switch and the third switch, such that the second inductive current generated by the battery decreases and is equal to or less than the quiescent current.

\* \* \* \* \*